United States Patent Office 3,829,336
Patented Aug. 13, 1974

3,829,336
PROPELLANTS PLASTICIZED WITH HIGH ENERGY COMPOUNDS AND HAVING HIGH ENERGY POLYMERS AS BINDER
Raymond M. Price, Applegate, Calif., assignor to the United States of America as represented by the Secretary of the Army
No Drawing. Filed Oct. 23, 1969, Ser. No. 869,454
Int. Cl. C06d 5/06
U.S. Cl. 149—19.3        4 Claims

ABSTRACT OF THE DISCLOSURE

High energy copolymers or terpolymers that have high $NF_2$ content. The polymers are used in solid propellant compositions and are made by incorporation of small quantities of non-energetic monomer molecules with basic side chain ester groups into energetic difluoramino polymers by copolymerization techniques which increase the affinity of the polymers for acidic difluoramino plasticizers [e.g., TVOPA, 1,2,3-tris(1,2-bis-(difluoramino)ethoxy) propane or OPE, 1,2 - bis[2,2,3 - tris(difluoramino)propoxy]-1,2-bis(difluoroamino)ethane]. Higher plasticizer to polymer ratios result in a higher difluoramino content in the binder system and a correspondent higher energy propellant wherein used. Representative of the non-energetic monomer molecules (also referred to as inert nonfunctional material), are methyl acrylate and methyl methacrylate which are paired in a reaction with a selected energetic difluoramino material such as 2,3-bis(difluoramino)propyl acrylate (NFPA), 2,3-bis(difluoramino) propyl methacrylate (NFPMA), or the like to yield a copolymer. A ternary copolymer is produced when a functional monomer selected from hydroxyethyl acrylate, hydroxyethyl methacrylate, hydroxypropyl methacrylate, or hydroxypropyl acrylate, is employed along with the paired reactants of the reaction. The resulting ternary copolymer is a prepolymer capable of being cured to form polyurethane polymers. Further, a ternary copolymer having different functionality results when a functional monomer selected from glycidyl methacrylate, glycidyl acrylate, acrylic acid, or methacrylic acid is employed in a reaction with the paired reactants specified above. This type ternary copolymer is capable of being cured to epoxy polymers.

BACKGROUND OF THE INVENTION

Research in the propellant field has yielded attractive high energy compounds which are utilized in the binder, plasticizer, or other functional parts of a propellent composition. The binders of the prior art propellants have utilized internal ester groups in the polymer portion of the binders which have been plasticized with Lewis-acid liquids such as nitro, nitrato, and difluoramino compounds. The ester groups greatly increase the amount of plasticizer that can be held and increase the ability of the polymer to retain the plasticizer at concentrations below the ultimate amount. Acid/base interactions become more important in these systems than cohesive energy density characteristics.

Nitro, nitrato, and difluoramino plasticizers are subject to hydrolysis catalyzed by both acids and bases resulting in the liberation of acids. This inadequacy has led to instability of propellants as well as a loss in mechanical properties and total energy content thereof.

Substitution of side chain ester groups for internal ester groups in the crosslinked polymer has resulted in some improvement of affinity for acid plasticizers. Hydrolysis of the side chain ester groups results only in a slight increase in plasticizer content and polymer chain scission is prevented. The mechanical properties of the propellant remain almost constant.

High energy propellants require high energy binders and plasticizers in addition to the other constituents in order to prevent a loss of energy caused by using inert or low energy materials for binding and plasticizing functions. An improvement which permits utilizing a higher amount of high energy plasticizer such as the difluoramino plasticizers described later herein would be attractive from the interest in energy content as well as physical properties of the pertinent propellant.

An object of this invention is to provide a means of increasing the affinity of a polymeric system for acidic difluoramino plasticizers.

Another object is to provide prepolymers which serve to increase the affinity of the polymeric binder system for acidic difluoramino plasticizers.

A further object is to provide a propellant utilizing prepolymers of this invention wherein the affinity for plasticizers of the difluoramino type has been increased.

SUMMARY OF THE INVENTION

High energy polymers containing $NF_2$ groups are altered by the placement, by copolymerization techniques, of short side chain ester groups in the molecular chain of difluoramino polymers. The altered polymers result in great improvement in the quantity of difluoramino plasticizer that can be held by the polymeric system or binder. By way of example, the incorporation of 28 weight percent of methyl methacrylate into the crosslinked NFPMA polymer through copolymerization results in an increase in the amount (e.g., by a factor or about 7.6 to 1) of acidic type difluoramino plasticizer (e.g., TVOPA or OPE) that can be held by the polymeric system. The increased difluoramino content provides a higher energy propellant.

The prepolymers of this invention form polyurethanes or epoxy polymers, depending on the system ingredients selected and curing agents employed. The difluoramino component of each polymer system is NFPA and NFPMA; however, tetrakis(difluoramino)amyl acrylate (TAA) may be substituted for NFPA, and tetrakis(difluoramino)amyl methacrylate (TAMA) may be substituted for NFPMA.

DESCRIPTION OF THE PREFERRED EMBODIMENTS

A number of new compounds used in the prepolymers and the propellants of this invention have resulted from research in the Nitrogen-Fluorine chemistry field. The new compounds: TVOPA, OPE, NFPA, NFPMA, TAA, and TAMA are described below along with a procedure for making the compounds.

Preparation of New Compounds

A. Preparation of TVOPA: TVOPA is prepared by reacting Tris(vinoxy)propane (prepared in accordance with U.S. Pat. 2,969,400) with tetrafluorohydrazine. TVOPA contains two high energy difluoramino groups, $NF_2$, in each of the three vinoxy groups of the starting compound, tris(vinoxy)propane. The reaction of tetrafluorohydrazine with tris(vinoxy)propane to form TVOPA is conducted under pressure in the range of 500 mm. of mercury up to about 600 p.s.i.g. and temperature ranges of about 0° to 120° C. The reaction is conducted in the presence of an inert volatile organic solvent, preferably one that is a suitable solvent for both the TVOPA as well as the reactant. Aromatic and aliphatic hydrocarbons, chlorinated hydrocarbons, ethers and ketones may be employed as the solvent. Typical solvents include diethyl ether, dipropyl ether, pentane, hexane, chloroform, carbon tetrachloride, methylene chloride, benzene, toluene, xylene, and acetone.

Preparation of OPE 1,2,2,5,6,9,9,10-Octakis(difluoramino) - 4,7 - dioxadecane, also known as 1,2 - di - [2,2,3-tris(difluoramino)propoxy]-1,2-bis(difluoramino)-ethane (OPE) is represented by the following structure:

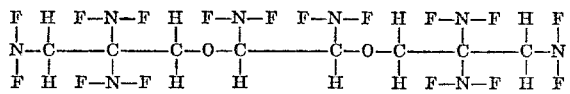

The complete process for the preparation of this compound involves the following series of reactions:

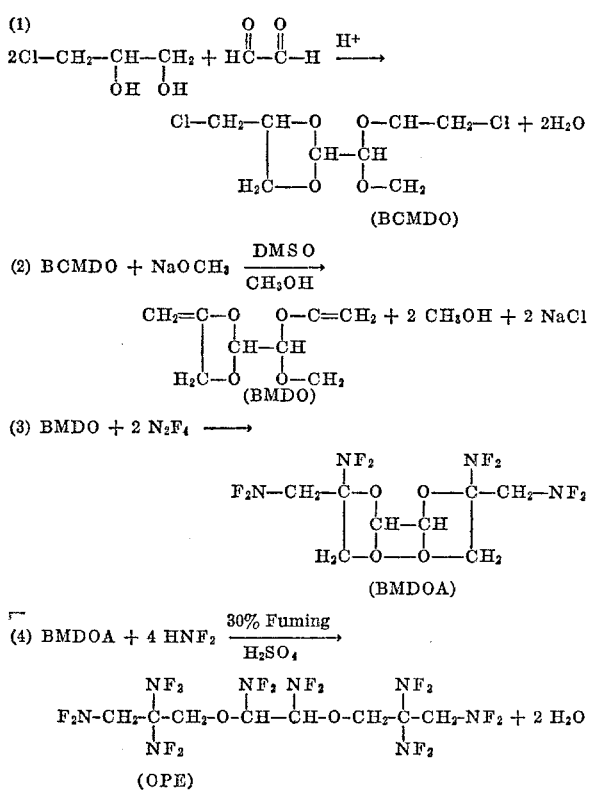

In reaction (1) 4,4′-bis(chloromethyl)-2,2′-bi-1,3 dioxolane (BCMDO) is prepared from 3-chloro-1,2-propanediol and crystalline-80% glyoxal using Amberlyst-15(ion exchange resin) acid catalyst. At first the BCMDO was prepared according to the literature using 30% aqueous glyoxal and sulfuric acid catalyst, but here some difficulty was encountered with hydroxyl and carbonyl-containing impurities. Consistent yields of about 95% are obtained in the current method and it is found unnecessary to distill the crude BCMDO. 4,4′-Dimethylene-(2,2′-bi-1,3-dioxolane) (BMDO) is obtained in reaction (2) by reaction of the BCMDO with sodium methoxide in methanol and dimethyl sulfoxide. The yield of crude BMDO is about 85% and the purity is such that further purification by distillation is not necessary.

4,4′ - Bis(difluoramino) - 4,4′-bis(difluoraminomethyl) (2,2′-bi-1,3-dioxolane) (BMDOA) in reaction (3) is prepared from BMDO (in chloroform) and tetrafluorohydrazine ($N_2F_4$) in a high pressure-rocking bomb static reactor. The production of about 60 grams per run is a convenient scale, the yields averaging about 95% of the theoretical. The production of BMDOA was at first attempted in a high-pressure liquid phase flow reactor, but considerable difficulty was encountered because of the tendency for a solid material to be deposited in the reactor lines causing a plug. The solids may arise from at least two sources: an insoluble stereoisomeric form of BMDO and degradation of the olefin by hydrogen fluoride.

The final step (reaction 4) consists of adding BMDOA in Freon-113 (1.44 ml. of solvent per gram of adduct) to a mixture of $HNF_2$ and 30% fuming sulfuric acid. The $HNF_2$ is generated immediately prior to use from aqueous difluorourea.

The reaction is followed by a washing step during which the product is isolated in a solution of methylene chloride. The crude product is further refined by column chromatography using silica gel and 6/1 pentane/methylene chloride solvent.

Preparation of TAA and TAMA

The unsaturated alcohol, divinylcarbinol (10% solution in $CHCl_3$) having the formula

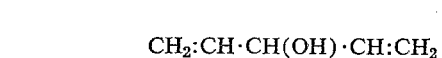

is reacted with excess $N_2F_4$ for saturating the double bonds under a pressure in the range of 200 to 500 p.s.i. at a programmed reaction temperature at 50° C. for 1 hr., 100° C. for 1 hr., and with a final temperature ranging principally from 120° C. to about 140° C. for a final reaction period of 2 to 3 hours. The crude product obtained is reacted with excess acryloyl chloride using zinc chloride as the esterification catalyst at a temperature in the range of 30° to 50° C. under a reduced pressure of about 100 mm. Hg absolute for a period in the range of 30 minutes to 2 hours to form tetrakis (difluoramino) amyl acrylate (TAA), also referred to as 3-(1,2,4,5-tetrakis-($NF_2$)-pentyl) acrylate.

For the product TAMA (tetrakis (difluoramino) amyl methacrylate) the crude product, after a first stage reaction with $N_2F_4$ as set forth above, to saturate the double bonds, is reacted with a methacryloyl chloride to form the specified product.

The acrylate with which concerned can be purified by short-path vacuum distillation. Column chromatograph on silica gel, with use of $CHCl_3$ or similar solvent for elution, or gas chromatography can also be used for isolation of the substantially pure product.

Preparation of NFPA and NFPMA

The compound 2,3-bis(difluoramino)propyl acrylate, also referred to as NFPA may be prepared as follows:

To a 200 ml. three-necked flask fitted with mechanical stirrer, condenser, thermometer, and dropping funnel (all outlets covered with a drying tube containing granular anhydrous calcium sulfate) is introduced 7.72 parts (0.029 mole) of triphenylphosphine and 100 ml. anhydrous diethyl ether (commercial grade). To this solution is added 11.0 parts (0.029 mole) of 2,3-bis(difluoramino)propyl $\alpha,\beta$-dibromoproprionate. A slightly exothermic heat of reaction (23° C. to 27° C.) and an immediate precipitate of triphenylphosphine dibromide are noted. The addition is completed within a ten-minute period. The reaction is continued for a period of twenty-four hours. The solids are removed by filtration and the ether at reduced pressure on a rotary evaporator. The residue, containing a small quantity of solids, is treated with 100 ml. of pentane and filtered again. The pentane is removed and the residue first examined by gas chromatography and then distilled. The gas chromatogram showed the product to be approximately 95% pure, NFPA.

NFPMA, 2,3-bis(difluoramino)propyl methacrylate, may be prepared by employing a system similar to that used for preparing NFPA. For example, 0.055 mole of 2,3-bis(difluoramino)propyl $\alpha,\beta$-dibromoisobutyrate is added over a period of thirty minutes to 0.055 mole of triphenyl phosphine in 200 ml. of anhydrous diethyl ether to give an immediate precipitate of triphenylphosphine bibromide. Another 100 ml. of anhydrous ether is added during the course of the addition to facilitate stirring of the mixture. After eighteen hours the mixture is filtered free of solids followed by removal of the ether at reduced pressure on a rotary evaporator. The product is found to be 97–98% pure, NFPMA.

The reactants (e.g., 2,3-bis(difluoramino)propyl $\alpha,\beta$-dibromopropionate and 2,3-bis(difluoramino)propyl $\alpha,\beta$-dibromoisobutyrate) used in the above processes are prepared by reacting the appropriate alkenyl $\alpha,\beta$-dibromopropionate or the dibromoisobutyrate with tetrafluorohydrazine at a temperature of about 50° C. to 120° C. or by reacting the corresponding alkyl ester with tetrafluorohydrazine at elevated temperatures of about 200° to 400° C.

The following prepolymers are included in this invention:

1. Prepolymers that form polyurethanes:
   (a) Methyl acrylate (MA)/NFPA/Hydroxyethyl acrylate (HEA)
   (b) MA/NFPA/hydroxypropyl acrylate (HPA)
   (c) Methyl methacrylate (MMA)/NFPMA/hydroxyethyl methacrylate (HEMA)
   (d) MMA/NFPMA/hydroxypropyl methacrylate (HPMA)
2. Prepolymers that form epoxy polymers:
   (a) MA/NFPA/glycidyl acrylate (GA)
   (b) MMA/NFPMA/glycidyl methacrylate (GMA)
   (c) MA/NFPA/acrylic acid (AA)
   (d) MMA/NFPMA/methacrylic acid (MAA)

High energy polymers with increased affinity for acidic difluoramino plasticizer contain the representative MA/NFPA copolymer. The MA/NFPA copolymer is prepared by addition polymerization in order to avoid possible interference from other copolymer components such as hydroxypropyl methacrylate. When a third ingredient selected from functional monomers is employed in the reaction, a ternary copolymer is produced which is more specifically set forth hereinbelow.

In order to avoid excessive heat during the polymerization reaction, a functional monomer is introduced in the addition step so that the crosslinking process can be accomplished with less danger. With the functional monomer added the above noted prepolymer systems are representative of a number of systems which promote the increased affinity of the polymer for acidic difluoramino plasticizer. The term inert functional monomer is used to identify monomers like HEMA having hydroxyl functionality, GA having epoxide functionality, and AA having carboxyl functionality. The term inert nonfunctional monomer identifies such monomers as MMA, MA and the like. The preferred quantity and ranges for the two types of monomers are set forth hereinbelow.

The inert nonfunctional acrylate or methacrylate of the acrylate and methacrylate copolymer systems should be present in quantities of 5 to 50 weight percent. The inert functional acrylate or methacrylate should be present in quantities of 1 to 10 weight percent.

The preferred quantity range for the inert nonfunctional acrylate or methacrylate is from about 10 to about 30 weight percent. The preferred quantity range for the inert functional acrylate or methacrylate is from about 2 to about 6 weight percent.

The crosslinking agent for the prepolymers can be employed in crosslinker/prepolymer equivalent ratios of .5/1 to 1.2/1. Ratios of .9/1 to 1.1/1 are preferred.

Table I, below, illustrates the benefit derived by using methyl acrylate in the crosslinked NFPA polymer through copolymerization. The ability to imbibe acid type difluoramino plasticizers (e.g., TVOPA or OPE) is markedly apparent in that an increase by a factor of about 7.6/1 is noted. Eethylene diacrylate (EDA) is used as the crosslinker is the amount specified.

TABLE I

Effect of MA concentration in MA/NFPA copolymer on the volume of difluororamino plasticizer absorbed (A) EDA Crosslinker—1 mole/260 carbon in chain

| MA concentration | | Volume TVOPA/volume copolymer in 1 month | |
|---|---|---|---|
| Wt. percent | Moles | Actual | Relative |
| 0 | 0 | 0.42 | 1.0 |
| 28 | 50 | 3.20 | 7.6 |
| 54 | 75 | 2.78 | 6.7 |
| 100 | 100 | 7 | 14 |

(B) EDA Crosslinker—1 mole/780 carbon in chain

| 0 | 0 | 0.84 | 1.0 |
| 28 | 50 | 3.70 | 4.4 |
| 53 | 75 | 3.94 | 4.7 |

The unique effect of decreasing the difluoramino content of the polymer to obtain increased difluoramine plasticizer content and higher total difluoramido content is shown in Tables II and III (below). The decrease occurs due to the fact that the difluoramino content in the copolymer system, NFPA/MA, is less than in the NFPA polymer containing only NFPA. The affinity for acid type plasticizer (e.g., TVOPA) results in a higher difluoramino content for the system containing MA.

TABLE II

| MA in copolymer, wt. percent | Relative TVOPA/ polymer ratio | Approximate $NF_2$ content, wt. percent |
|---|---|---|
| 0 | 1.0 | 56.1 |
| 28 | 7.6 | 59.4 |

If the more energetic plasticizer OPE is used instead of TVOPA, the results can be expected to be more striking (as noted in Table III below, wherein the $NF_2$ content is 70.5% when the OPE/polymer ratio is 7.6)

TABLE III

| MA in copolymer wt. percent | Relative OPE/ polymer ratio | Approximate $NF_2$ content, wt. percent |
|---|---|---|
| 0 | 1.0 | 61.5 |
| 28 | 7.6 | 70.5 |

Tables IV, V, and VI set forth representative prepolymers, or ternary copolymers which contain NFPA or NFPMA along with a nonfunctional acrylate or methacrylate (e.g., MMA, MA, or the like) and a funcutional acrylate or methacrylate (e.g., HEMA, GA, AA, or the like).

TABLE IV

Prepolymer with Hydroxyl Functionality

Material: Parts by Wt.
NFPMA ---------------------------- 68.11
MMA ------------------------------ 29.49
HEMA ----------------------------- 2.40

The above prepolymer is cured with a diisocyanate such as tolylene diisocyanate (TDI) or Hexamethylene diisocyanate (HDI). Catalysts for curing are of the tin complex type such as dibutyl tin dilaurate, or the cure may be catalyzed by vanadium, vanadyl or titanyl acetylacetonates.

TABLE V

Prepolymer with Epoxide Functionality

| Material: | Parts by Wt. |
|---|---|
| NFPA | 69.90 |
| MA | 27.84 |
| GA | 2.26 |

This prepolymer is cured with reactive dicarboxylic acids such as perfluoroglutaric acid.

TABLE VI

Prepolymer with Carboxyl Functionality

| Material: | Parts by Wt. |
|---|---|
| NFPA | 86.20 |
| MA | 11.45 |
| AA | 2.35 |

Cure is obtained in this polymer by use of diepoxide crosslinking agents.

The prepolymers are prepared under an inert gas such as argon or nitrogen in an inert organic solvent such as ethyl acetate or methylene chloride. The solvent/monomer ratio is about 4/1 by wt. and suitable catalysts are benzoyl peroxide, dichlorbenzoyl peroxide, lauroyl peroxide, etc. The molecular weight of the prepolymer may be varied by adjusting the reaction temperature, the amount and kind of catalyst and by the use of chain terminating agents. The molecular weight must be low enough to give reasonable viscosity characteristics and to permit adequate solids loading the plasticized binder.

The reaction of energetic materials such as NFPA are generally carried out under remote conditions unless very small quantities (e.g., a few grams) are employed in an inert solvent wherein the reaction takes place.

The procedure set forth below serves to illustrate a typical reaction whereby a copolymer of NFPA and MA are prepared. Also, the procedure for producing a ternary copolymer, NFPA/MA/AA, by including the functional monomer, AA, in the reaction is given.

To a remotely operated reflux reaction vessel equipped with temperature measuring means, heating and cooling means, pressure measuring and regulating means, and adapted for receiving, mixing, and maintaining ingredients in a reaction mixture under an inert atmosphere (e.g., under an inert gas such as argon or nitrogen), is introduced 300 milliliters of ethyl acetate, 80 grams of NFPA, and 2 grams of benzoyl peroxide initiator. A solution of 19 grams of MA contained in 60 milliliters of ethyl acetate is added incrementally to the reaction vessel while the reaction mixture is stirred, and refluxed in the range of about 70° C. for sufficient time (e.g., up to about 24 hours) to yield a copolymer of NFPA and MA. To produce the ternary copolymer, NFPA/MA/AA, the third ingredient (e.g., 1.0 gram of AA contained in 40 milliliters of ethyl acetate) is incrementally added along with the ethyl acetate solution of MA and refluxed sufficient time as noted. Then the excess solvent is removed, vacuum stripped, and the prepolymer recovered is stored under inert conditions (e.g., under an inert solvent) until ready for use in a propellant formulation.

A typical propellant made from the prepolymer in Table IV is shown.

TABLE VII

| Component: | Parts by wt. |
|---|---|
| TDI | 0.242 |
| Prepolymer (Table IV) | 13.690 |
| TVOPA | 41.063 |
| AP | 30.000 |
| Al | 15.000 |
| Na$_3$PO$_4$ (stabilizer) | 0.500 |
| TiO(AA)$_2$ (catalyst) | 0.500 |

The cure is obtained at temperature from 10° C. to 50° C.

In order to obtain maximum affinity of the copolymer for difluoramino plasticizers and to maintain maximum difluoramino content in the copolymer, it is essential to have as much regularity in the copolymer composition as possible. The relative reactivities of all monomers in any paired arrangement must be similar and approach the value of 1. This cannot be accomplished in monomer systems containing both acrylate and methacrylate monomers. The monomer mixture must consist either of acrylates or of methacrylates.

It is also necessary that the side chain ester group of the inert nonfunctional monomer contain but one methyl group. The beneficial effect of the side chain ester group rapidly decreases with addition of more methyl groups. The difluoramino content of the copolymer also decreases.

I claim:

1. A propellant composition comprising an acidic difluoramino plasticizer selected from 1,2,3-tris[1,2-bis(difluoramino)ethoxy]propane and 1,2-bis[2,2,3-bis(difluoramino)propoxy]-1,2 - bis(difluoramino)ethane; ammonium perchlorate; aluminum; trisodium phosphate stabilizer; titanyl acetylacetonate catalyst; tolylene diisocyanate curing agent; and high energy polymers prepared by reacting an energetic difluoramino material selected from the group consisting of 2,3-bis(difluoramino)propyl acrylate, 2,3-bis(difluoramino)propyl methacrylate, tetrakis(difluoramino) amyl acrylate, and tetrakis(difluoramino) amyl acrylate, and tetrakis(difluoramino)amyl methacrylate with an inert nonfunctional material selected from the group consisting of methyl acrylate and methyl methacrylate and a functional monomer selected from the group consisting of acrylic acid, glycidyl acrylate, glycidyl methacrylate, hydroxyethyl acrylate, hydroxyethyl methacrylate, hydroxypropyl acrylate, hydroxypropyl methacrylate, and methacrylic acid in an inert organic solvent and in the presence of a suitable peroxide catalyst to form a methacrylate or acrylate copolymer system which is capable of being cured; said inert nonfunctional material being present in amounts from about 5 to about 50 weight percent of said copolymer system; and said functional monomer being present in amounts from about 1 to about 10 weight percent of said copolymer system.

2. The propellant composition of claim 1 wherein said plasticizer is 1,2,3-tris[1,2-bis(difluoramino)ethoxy]propane and is present in an amount of about 41 weight percent of said composition, said methacrylate copolymer system is present in an amount of about 13 to 14 weight percent of said composition, said ammonium perchlorate is present in an amount of about 30 weight percent of said composition, said aluminum is present in an amount of about 15 weight percent of said composition, said trisodium phosphate stabilizer is present in an amount of about 0.5 weight precent of said composition, said titanyl acetylacetonate catalyst is present in an amount of about 0.5 weight percent of said composition, and said tolylene diisocyanate curing agent is present in an amount of about 0.2 to 0.3 weight precent of said composition.

3. The propellant composition of claim 1 wherein said high energy polymers were prepared by reacting the high energetic difluoramino material 2,3-bis(difluoramino) propyl acrylate with the nonfunctional material methyl acrylate and the functional monomer acrylic acid to form an acrylate copolymer system, said acrylate copolymer system comprising said 2,3-bis(difluoramino)propyl acrylate in an amount of about 86.20 weight percent of said copolymer system; said methyl acrylate in an amount of about 11.45 weight percent of said copolymer system; and said acrylic acid in an amount of about 2.35 weight percent of said copolymer system.

4. The propellant composition of claim 1 wherein said high energy polymers were prepared by reacting the high energetic difluoramino material 2,3-bis(difluoramino)propyl methacrylate with the nonfunctional material methyl methacrylate and the functional monomer hydroxyethyl methacrylate to form a methacrylate copolymer system, said methacrylate copolymer system comprising said 2,3-bis(difluoramino)propyl methacrylate in an amount of about 68.11 weight percent of said copolymer system; said methyl methacrylate in an amount of about 29.49 weight percent of said copolymer system; and said hydroxyethyl methacrylate in an amount of about 2.40 weight percent of said copolymer system.

References Cited

UNITED STATES PATENTS

| | | | |
|---|---|---|---|
| 3,441,518 | 4/1969 | Stogryn et al. | 149—19 X |
| 3,441,520 | 4/1969 | Bosniack et al. | 149—19 X |
| 3,441,549 | 4/1969 | Gardiner et al. | 149—19 X |
| 3,441,550 | 4/1969 | Zimmerman | 149—19 X |

BENJAMIN R. PADGETT, Primary Examiner

U.S. Cl. X.R.

149—19.5, 19.91, 20